United States Patent [19]
Nix

[11] Patent Number: 5,488,801
[45] Date of Patent: Feb. 6, 1996

[54] SOLAR APPLIANCES

[76] Inventor: Martin E. Nix, P.O. Box 95173, Seattle, Wash. 98145-2173

[21] Appl. No.: 207,850

[22] Filed: Mar. 9, 1994

[51] Int. Cl.$^6$ ............................................. A01G 31/00
[52] U.S. Cl. ............................... 47/60; 47/17; 29/401.1
[58] Field of Search ................. 29/401.1; 47/60 NL, 47/60 EC, 17 RL

[56] References Cited

U.S. PATENT DOCUMENTS

| 4,184,479 | 1/1980 | Ratliff | 47/17 RL |
| 4,242,833 | 1/1981 | Maes | 47/17 RL |
| 4,251,104 | 2/1981 | Holt | 29/401.1 |
| 4,333,680 | 6/1982 | Wolf | 29/401.1 |
| 5,048,171 | 9/1991 | Bidwell | 29/401.1 |
| 5,222,287 | 6/1993 | Cooper | 29/401.1 |

FOREIGN PATENT DOCUMENTS

| 96945 | 12/1983 | European Pat. Off. | 47/60 EC |
| 1087116 | 4/1984 | U.S.S.R. | 47/60 EC |
| 1279563 | 12/1986 | U.S.S.R. | 47/60 EC |
| 21755 | 11/1993 | WIPO | 47/17 RL |

Primary Examiner—Henry E. Raduazo

[57] ABSTRACT

Designed is a system for recycling abandoned appliances as refrigerators, for conversion into solar applications. Designed is a converted refrigerator into a solar greenhouse, thus extending the growing season in cold climates. Illustrated is a solar powered fan, a skylight with a back reflector, a door window, screen to provide an insect barrier and a recycled refrigerator.

5 Claims, 2 Drawing Sheets

SOLAR APPLIANCES

FIELD OF INVENTION

Illustrated is an improvement in the art of the use of recycled materials and an improvement in the art of solar energy utilization.

SUMMARY OF INVENTION

There is a strong need to reduce the amount of materials thrown away resulting in environmental destruction. Many applicances as used hot water heaters, ovens and refrigerators each year end up in land fills, but these appliances can be usefully recycled into solar appliances.

It is an object to use photovoltaic powered fans for ventilation and movement of air.

It is an object to install screens on a converted refrigerator for insect control.

It is an object to remove unwanted compressors and exchangers and recycle them.

It is an object to remove and recycle freon.

It is an object to install a solar skylight at the top of a recycled refrigerator.

It is an object to install a window on the front of a converted refrigerator for viewing the plant on the interior.

It is an object to install a solar reflector above the solar skylight so as to reflect sunlight into the skylight and downwards towards the plant.

It is an object to recycle appliances for solar applications and to improve environmental quality.

DESCRIPTION OF PREFERRED EMBODIMENTS

Figure 1A:
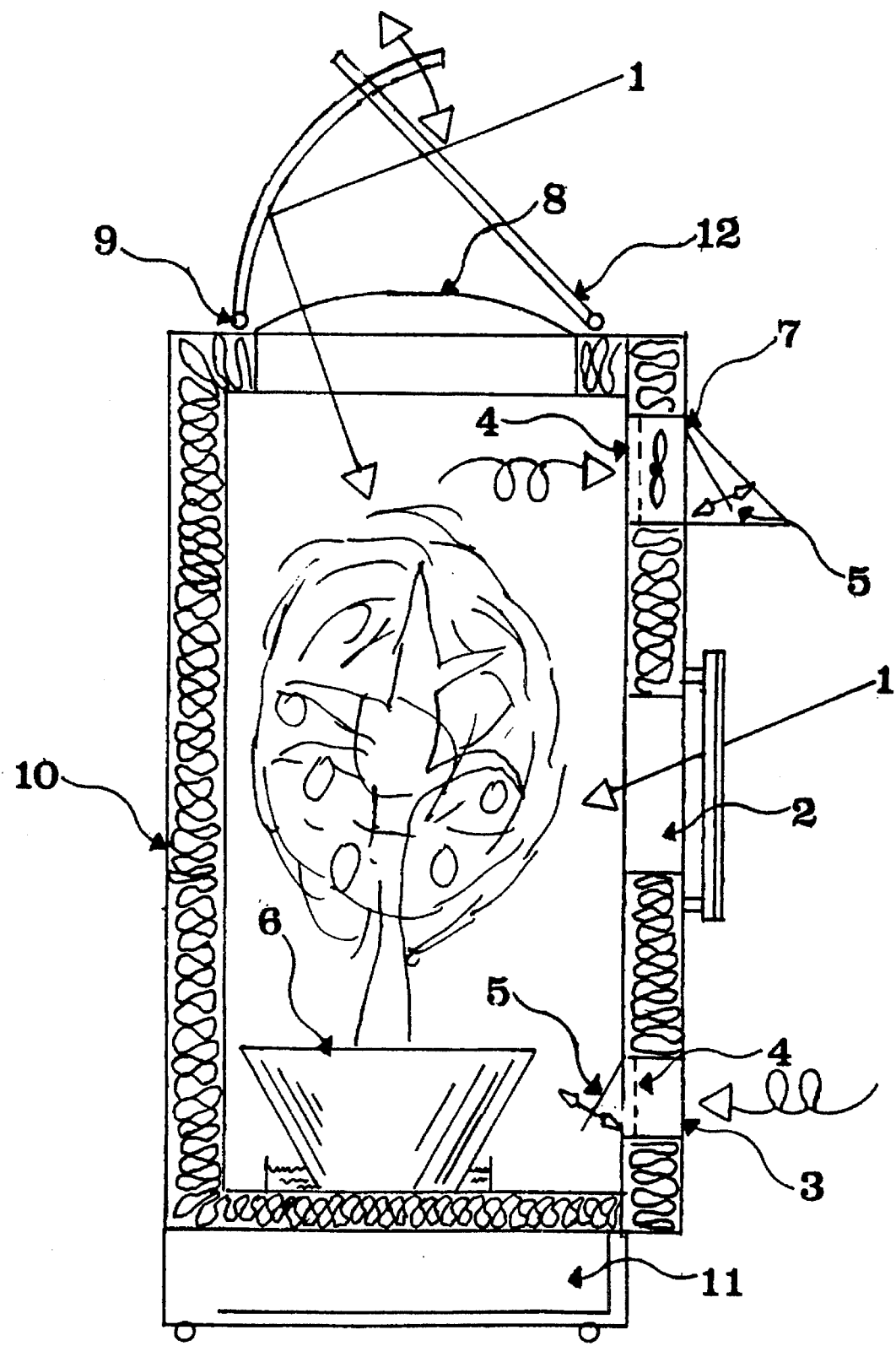
FIG. 1A is a cross sectional view of the interior and the functioning components of the converted refrigerator.
Figure 1B:
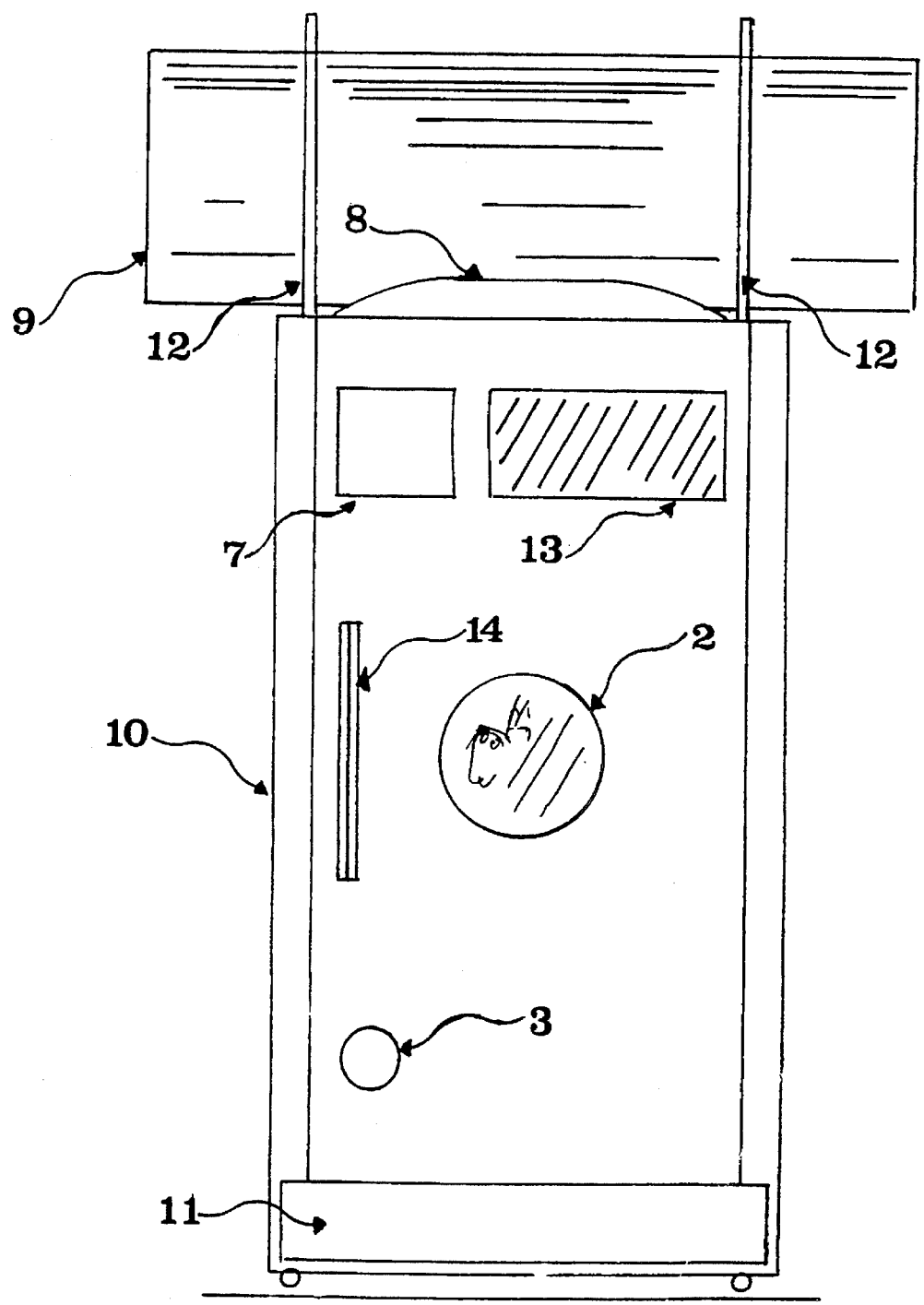
FIG. 1B is a frontal elevation of the converted refrigerator.

Illustrated in FIG. 1A and FIG. 1B is a converted refrigerator (10) to become a thermal insulated greenhouse. Illustrated is an interior cross section with for comparison a frontal elevation. The exchanger and compressor along with freon (11) are removed and recycled, thus the entire refrigerator is lighter weight. The insulated shell of the refrigerator (10) is then cut for installation of a skylight (8) at the top of the refrigerator (10) roof. A window (2) for admission of more light (1) is cut into the refrigerator door or side (10). While an adjustable solar reflector (9) reflects sunlight (1) downwards through the skylight (8). Adjustable straps (12) move the solar reflector (9) for optimal seasonal adjustment. The existing handle(14) is kept for closing and opening the door for access to the interior plant (6). So as to keep the potted plant cool and supplied with outdoor air a photovoltaic powered fan (7)(13) operates during sunny conditions. A solar cell (13) provides electrical power to a fan (7). During night or cloudy conditions a moveable panel (5) closes and stops the exchange of outdoor air to the interior. At both the air inlet and outlet are screens (4) so as to keep unwanted insects out and wanted insects inside. The net result is a thermally functional greenhouse capable of growing plants even in cold climates as Alaska.

I claim:

1. A method of converting a conventional refrigerator into a growing chamber for plants comprising the step of providing a conventional refrigerator having a door and insulated walls including sidewalls a top wall and floor which define an interior and exterior, removing a portion of said insulated walls, replacing said removed portion with a transparent or translucent cover capable of admitting sunlight, and providing a reflector on or adjacent said removed portion to direct light into said refrigerator and thus adapting it for use as a growing chamber for plants.

2. The method of claim 1 further including the step of removing a portion of said door and replacing said removed portion with a window means permitting viewing the interior of said growing chamber.

3. The Method of claim 1 further including the step of bending or curving said reflector whereby light reflected into said growing chamber is evenly distributed to the interior of said growing chamber.

4. The method of claim 1 further including the step of providing an opening into said interior, and further including the step of providing said opening with a fan means for circulation of cooling air into said interior.

5. A growing chamber formed by the method of claim 1.

* * * * *